(12) United States Patent
Chino

(10) Patent No.: US 8,903,678 B2
(45) Date of Patent: Dec. 2, 2014

(54) SENSING DEVICE AND ELECTRONIC APPARATUS

(75) Inventor: Taketo Chino, Hokuto (JP)

(73) Assignee: Seiko Epson Corporation (JP)

( * ) Notice: Subject to any disclaimer, the term of this patent is extended or adjusted under 35 U.S.C. 154(b) by 158 days.

(21) Appl. No.: 13/118,813

(22) Filed: May 31, 2011

(65) Prior Publication Data

US 2012/0022824 A1 Jan. 26, 2012

(30) Foreign Application Priority Data

Jul. 22, 2010 (JP) ................................ 2010-164597

(51) Int. Cl.
G01P 15/00 (2006.01)
G01P 13/00 (2006.01)

(52) U.S. Cl.
CPC ..................................... G01P 13/00 (2013.01)
USPC ............ 702/141; 702/142; 702/145; 702/146

(58) Field of Classification Search
USPC .................................. 702/141, 142, 145–146
See application file for complete search history.

(56) References Cited

U.S. PATENT DOCUMENTS

| 4,197,582 | A | 4/1980 | Johnston et al. |
| 6,505,515 | B1 | 1/2003 | Delaporte |
| 7,689,378 | B2 * | 3/2010 | Kolen ............................ 702/150 |
| 7,868,918 | B2 | 1/2011 | Kamiya et al. |
| 2005/0081629 | A1 * | 4/2005 | Hoshal ........................ 73/504.03 |
| 2006/0236761 | A1 * | 10/2006 | Inoue et al. ...................... 73/510 |
| 2006/0249323 | A1 | 11/2006 | Kurata |
| 2007/0168047 | A1 | 7/2007 | Cromer et al. |
| 2007/0250261 | A1 * | 10/2007 | Soehren ........................ 701/207 |
| 2008/0174444 | A1 | 7/2008 | Noda et al. |
| 2008/0201501 | A1 | 8/2008 | Partani et al. |
| 2008/0234935 | A1 | 9/2008 | Wolf et al. |
| 2010/0192662 | A1 | 8/2010 | Yanni |

FOREIGN PATENT DOCUMENTS

| JP | 2002-532721 A | 10/2002 |
| JP | 2002-538456 A | 11/2002 |
| JP | 2006-298147 A | 11/2006 |
| JP | 2008-051587 A | 3/2008 |
| JP | 2008-175771 A | 7/2008 |
| JP | 2009-134071 | 6/2009 |
| WO | WO-00/36424 A1 | 6/2000 |
| WO | WO-00/52443 A1 | 9/2000 |
| WO | WO-2009/138941 A1 | 11/2009 |

* cited by examiner

*Primary Examiner* — Mischita Henson

(74) *Attorney, Agent, or Firm* — Harness, Dickey & Pierce, P.L.C.

(57) ABSTRACT

A sensing device with lower power consumption by controlling a rate for generating output data is to be provided. A sensing device includes: a sensor module including a group of sensors, at least one of which is set as a motion sensor; and a data generating unit that generates output data on the basis of outputs from the group of sensors. The data generating unit switches, on the basis of an output from the motion sensor, a rate for generating the output data.

9 Claims, 10 Drawing Sheets

SENSING DEVICE AND ELECTRONIC APPARATUS

BACKGROUND

1. Technical Field

The present invention relates to a sensing device, an electronic apparatus, and the like.

2. Related Art

Some sensor module includes a sensor that detects the motion of a gyro sensor, an acceleration sensor, or the like (hereinafter, a motion sensor). For example, a sensor module disclosed in JP-A-2009-134071 (Patent Document 1) includes an analog front end (AFE) and an AD converter (ADC). The sensor module converts a signal from the motion sensor and outputs the signal at a fixed rate. The rate of the output is fixed high in order to display the performance of the sensor module. Therefore, power consumption increases.

SUMMARY

An advantage of some aspects of the invention is to provide a sensing device with lower power consumption by controlling, on the basis of an output from a motion sensor, a rate for generating output data.

(1) An aspect of the invention is directed to a sensing device including: a sensor module including a group of sensors, at least one of which is set as a motion sensor; and a data generating unit that generates output data on the basis of outputs from the group of sensors. The data generating unit switches, on the basis of an output from the motion sensor, a rate for generating the output data.

According to the aspect, since the data generating unit switches, on the basis of the output of the motion sensor, the rate for generating the output data, it is possible to suppress power consumption compared with power consumed when the output data is generated at a high rate.

The motion sensor is a sensor that detects motion. Specifically, the motion sensor is a gyro sensor, an acceleration sensor, a speed sensor, or the like. The sensor module includes plural sensors (a group of sensors) in which at least one motion sensor is included.

The output from the motion sensor changes in association with the motion of the sensing device (e.g., movement, acceleration, or rotation). At this point, the output from the motion sensor may be associated with only a change in a specific direction (e.g., the horizontal direction or the vertical direction).

When the motion of the sensing device is large, a change per time of a measurement amount measured by the group of sensors is large. When a signal based on the output from the motion sensor is large, the data generating unit can keep the accuracy of the output data at an appropriate level by increasing the rate for generating the output data.

The data generating unit generates output data at a high rate only when the signal based on the output from the motion sensor is large. Therefore, it is possible to suppress power consumption compared with power consumed when the output data always continues to be generated at the high rate.

The data generating unit may switch two rates or may switch three or more rates. For example, by increasing the rates at multiple stages as a motion sensor output signal increases, it is possible to output the output data at appropriate accuracy without waste while suppressing power consumption.

"On the basis of the output from the motion sensor" may indicate that a value of the output itself from the motion sensor or a value obtained by amplifying and sampling the output is determined or an amount of change of the output or a value obtained by subjecting the output to other arithmetic processing is determined. The arithmetic processing means calculation of a maximum, a minimum, or an average. The output from the motion sensor may be outputs from plural motion sensors or may be an output from one motion sensor.

(2) In the sensing device, the data generating unit can switch a first rate and a second rate higher than the first rate as the rates and may perform switching from the first rate to the second rate on the basis of a comparison result of a signal based on the output from the motion sensor and a first threshold and perform switching from the second rate to the first rate on the basis of a comparison result of the signal based on the output from the motion sensor and a second threshold.

According to this configuration, the data generating unit generates the output data at the first rate or the second rate higher than the first rate on the basis of the output from the motion sensor. By switching the rates, it is possible to suppress power consumption compared with power consumed when the output data is always generated at the second rate. At this point, since the rates are switched at two stages, it is possible to simplify switching control in the data generating unit.

The data generating unit performs switching of the rates by comparing the signal based on the output from the motion sensor and the first and second thresholds. For example, the data generating unit performs switching from the first rate to the second rate if the signal based on the output from the motion sensor is equal to or larger than the first threshold and performs switching from the second rate to the first rate if the signal based on the output from the motion sensor decreases to be smaller than the second threshold after the switching.

The first threshold and the second threshold may be the same value or the second threshold may be set smaller than the first threshold with hysteresis imparted to the thresholds to prevent the thresholds from being easily affected by noise. The thresholds may be able to be set by a method in which a user writes the thresholds in, for example, a register or may be stored in a ROM or the like in advance.

(3) In the sensing device, the data generating unit may perform the switching from the second rate to the first rate on the basis of a comparison result of the signal based on the output from the motion sensor and the second threshold in a given time.

(4) In the sensing device, the data generating unit may perform the switching from the second rate to the first rate on the basis of a comparison result of an average of signals based on outputs from the motion sensor in a given period and the second threshold.

According to this configuration, after the signals based on outputs from the motion sensor in a given time and the second threshold are compared, the second rate is switched to the first rate. Therefore, it is possible to prevent the second rate from returning to the first rate by mistake because of influence of noise or the like.

In order to output the output data at appropriate accuracy, for example, if the output from the motion sensor is equal to or larger than the first threshold even in an instance, it is desirable to immediately switch the first rate to the second rate higher than the first rate. On the other hand, the switching from the second rate to the first rate is not required to be so quick.

Therefore, in the configurations, a determination time is set in the switching from the second rate to the first rate. The determination time is a given time. Signals based on outputs from the motion sensor obtained in the determination time and the second threshold are compared. For example, the second rate may be switched to the first rate only when all signals based on obtained outputs from plural motion sensors are smaller than the second threshold. An average of the signals based on the outputs from the motion sensor obtained in the determination time and the second threshold may be compared and the second rate may be switched to the first rate on the basis of a result of the comparison. By performing such comparison, it is possible to prevent the second rate from returning to the first rate by mistake because of the influence of noise or the like and surely switch the second rate to the first rate by performing such comparison.

The determination time may be set in, for example, a unit of millisecond, second, or minute or may be determined on the basis of the number of necessary data.

(5) In the sensing device, the data generating unit may apply the switching of the rates to only apart of the group of sensors.

According to this configuration, the switching of the two rates (the first rate and the second rate) is applied to only a part of the group of sensors. Consequently, it is possible to suppress power consumption compared with power consumed when all the sensors operate according to the second rate higher than the first rate.

(6) The sensing device may include a register unit including a status register that represents the rate for generating the output data. The data generating unit may update the status register when the rate changes.

According to this configuration, the rate of the output data generated by the data generating unit is reflected on the status register. Therefore, even a device (e.g., a system control unit) on the outside of the sensing device can learn a state of the rate simply by accessing the status register.

(7) In the sensing device, the data generating unit may output an interrupt signal when the status register is updated.

According to this configuration, when the rate of the output data generated by the data generating unit changes, it is also possible to inform a device on the outside of the sensing device of the change using the interrupt signal. Therefore, the device on the outside can access the status register only when necessary. The efficiency of processing is improved.

(8) In the sensing device, the data generating unit may output a signal representing the rate for generating the output data.

According to this configuration, the rate of the output data generated by the data generating unit is output as a signal. Therefore, devices on the inside and the outside of the sensing device that receive the signal can always grasp a state of the rate.

(9) Another aspect of the invention is directed to an electronic apparatus including the sensing device.

According to the aspect, it is possible to provide an electronic apparatus with power consumption suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are explained below with reference to the accompanying drawings.

1. First Embodiment

A first embodiment of the invention is explained with reference to FIGS. 1 to 5.

1.1. Configuration of a Sensor Module

Figure 1:
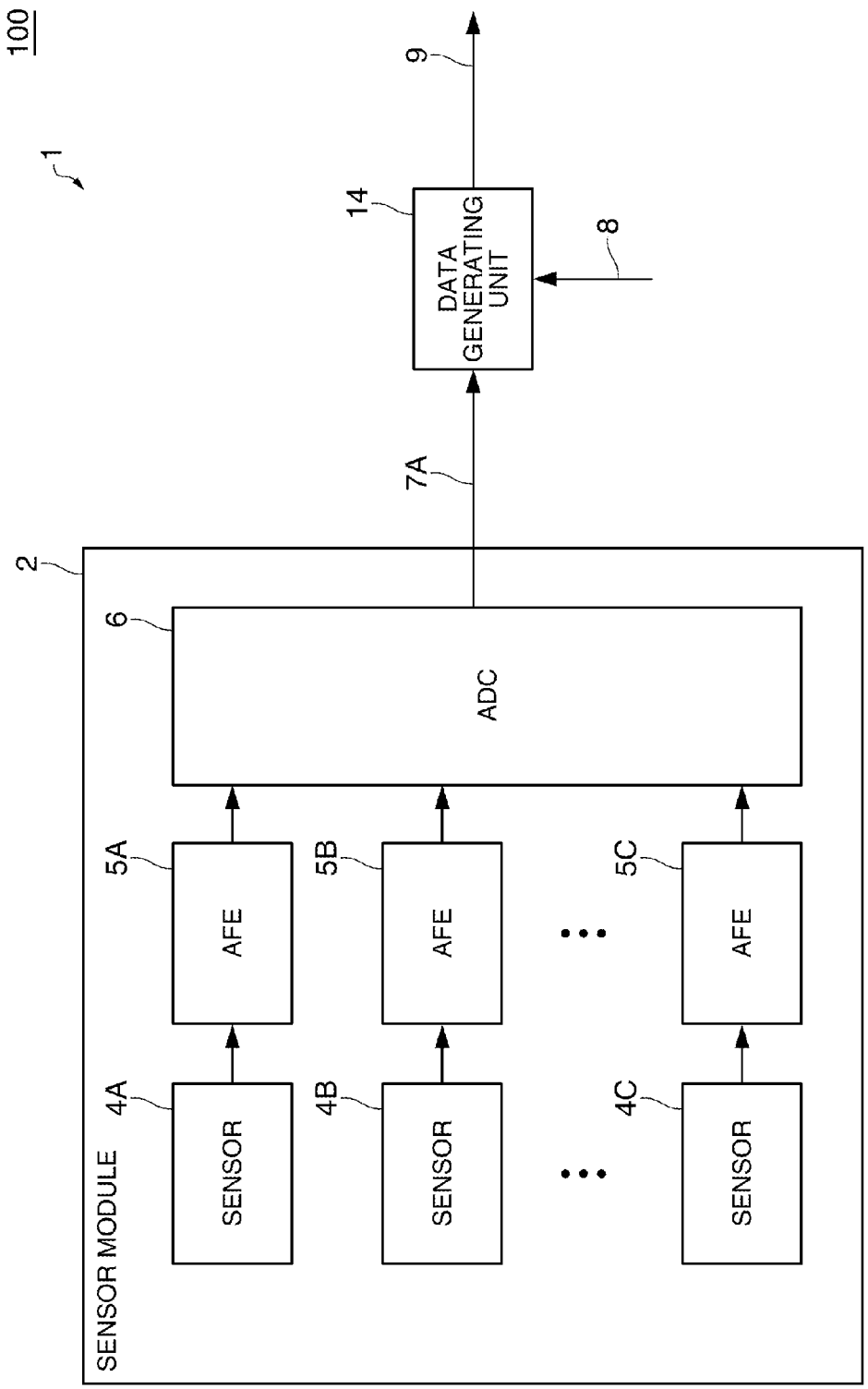
FIG. 1 is a diagram for explaining a sensor module in a first embodiment.

FIG. 1 is a block diagram of a part 1 of a sensing device 100. The sensing device 100 in the first embodiment includes at least a sensor module 2 and a data generating unit 14.

The sensor module 2 includes a group of sensors 4A to 4C, which are plural sensors. The sensor module 2 may include analog front ends (AFEs) 5A to 5C that perform signal amplification and the like and an AD converter (ADC) 6 that converts an analog amount into a digital value.

In this embodiment, at least one of the group of sensors 4A to 4C is a motion sensor. The motion sensor indicates a sensor that detects motion such as an acceleration sensor or a gyro sensor.

In FIG. 1, for example, the sensor 4A may be the motion sensor and the other sensors 4B and 4C may be any one of or a combination of a temperature and humidity sensor, a pressure sensor, a magnetic sensor, and a tactile sensor. For example, all of the group of sensors 4A to 4C may be motion sensors and configure a three-dimensional acceleration sensor or a triaxial gyro sensor. For example, the sensor 4A alone may function as a one-dimensional acceleration sensor or a uniaxial gyro sensor.

The AFEs 5A to 5C may respectively amplify outputs (e.g., analog signals) from the sensors 4A to 4C. In this embodiment, the amplified analog signal is converted into a digital signal using the ADC 6 of a successive approximation type. Since only one ADC 6 is provided for the group of sensors 4A to 4C, conversion processing is performed in a time division manner. The sensor module 2 may include plural ADCs respectively corresponding to the AFEs 5A to 5C.

A sensor module output signal 7A output from the ADC 6 is a signal based on outputs of the group of sensors 4A to 4C. The sensor module output signal 7A is output to the data generating unit 14.

The data generating unit 14 generates output data 9 from the sensor module output signal 7A. At this point, the data generating unit 14 switches, on the basis of data from the motion sensor in the sensor module output signal 7A, a rate for generating the output data 9. It is possible to reduce power consumption compared with power consumed when output data is always generated at a high rate. In generating the output data 9, the data generating unit 14 may use arithmetic operation parameters 8.

1.2. Configuration of the Data Generating Unit

Figure 2:
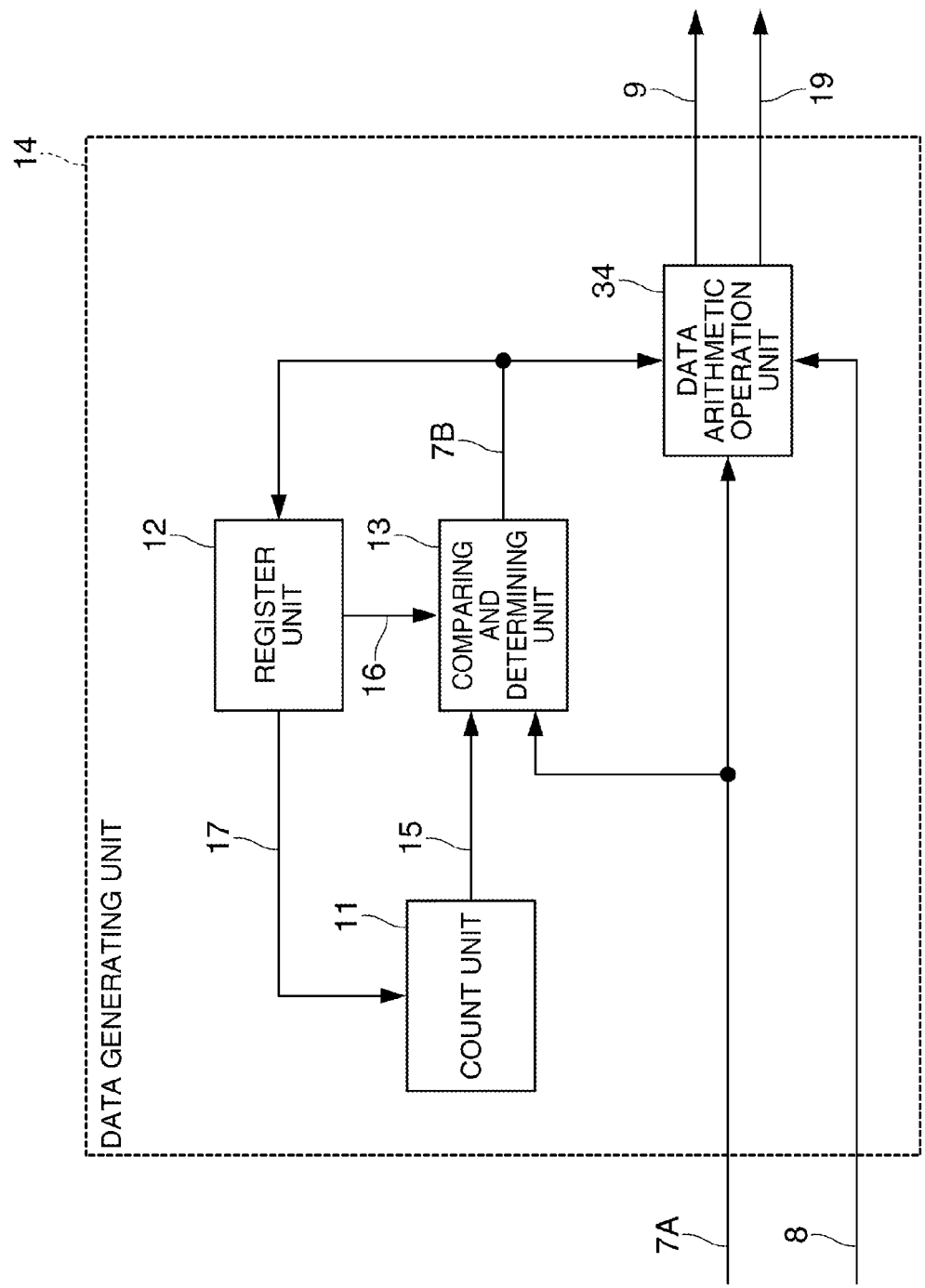
FIG. 2 is a diagram for explaining a data generating unit in the first embodiment.

FIG. 2 is a block diagram of the data generating unit 14 in the first embodiment. Components same as those shown in FIG. 1 are denoted by the same reference numerals and signs and explanation of the components is omitted.

In this example, the data generating unit 14 includes a comparing and determining unit 13 and a data arithmetic operation unit 34. Besides, the data generating unit 14 may include a count unit 11 and a register unit 12. The data generating unit 14 may be realized by, for example, a part of a microcomputer or a CPU.

The data arithmetic operation unit 34 reads the necessary arithmetic operation parameters 8 from, for example, the RAM 21 or the ROM 22 (see FIG. 3), performs an arithmetic operation of the arithmetic operation parameters 8 and the sensor module output signal 7A, and outputs a result of the arithmetic operation as the output data 9 at a predetermined rate. A signal used for generating the output data 9 is not only a signal output from the motion sensor but also signals output from all of the group of sensors.

The comparing and determining unit 13 selects data concerning the motion sensor from the sensor module output signal 7A and compares the data with a threshold. The comparing and determining unit 13 outputs a rate designation signal 7B according to a comparison result and instructs the data arithmetic operation unit 34 to switch the rate.

For example, when two thresholds T0 and T1 are set (T0<T1), the rate is sectioned into three ranges. First to third rates are respectively set for the ranges. The comparing and determining unit 13 instructs the data generating unit 14 to generate output data at the first rate if data concerning the motion sensor is smaller than T0, generate output data at the second rate if the data is equal to or larger than T0 and smaller than T1, and generate output data at the third rate if the data is equal to or larger than T1. A more detailed specific example is explained later with reference to a waveform chart.

The count unit 11 includes a counter that measures a determination time used for determination of switching of the rates. The determination time is time for acquiring a signal based on a motion sensor output used in one determination for switching the rates. The counter may be periodically reset on the basis of the determination time. The counter can measure given timing. The comparing and determining unit 13 can learn the determination time according to a count value 15 from the count unit 11. The comparing and determining unit 13 may determine from which of the sensors the data of the sensor module output signal 7A are output.

The register unit 12 stores the thresholds. The comparing and determining unit 13 may acquire threshold information 16 from the register unit 12. The comparing and determining unit 13 may store information such as the determination time and the number of sensors of the group of sensors and inform the count unit 11 of the information using an internal signal 17.

The data arithmetic operation unit 34 may output a state output signal 19, which represents information concerning the rate, to the outside of the data generating unit 14 together with the output data 9. When the rate designation signal 7B changes, the comparing and determining unit 13 may update the status register of the register unit 12 and inform the outside of the data generating unit 14 of the present state of the rate.

1.3. Overall Configuration of the Sensing Device

Figure 3:
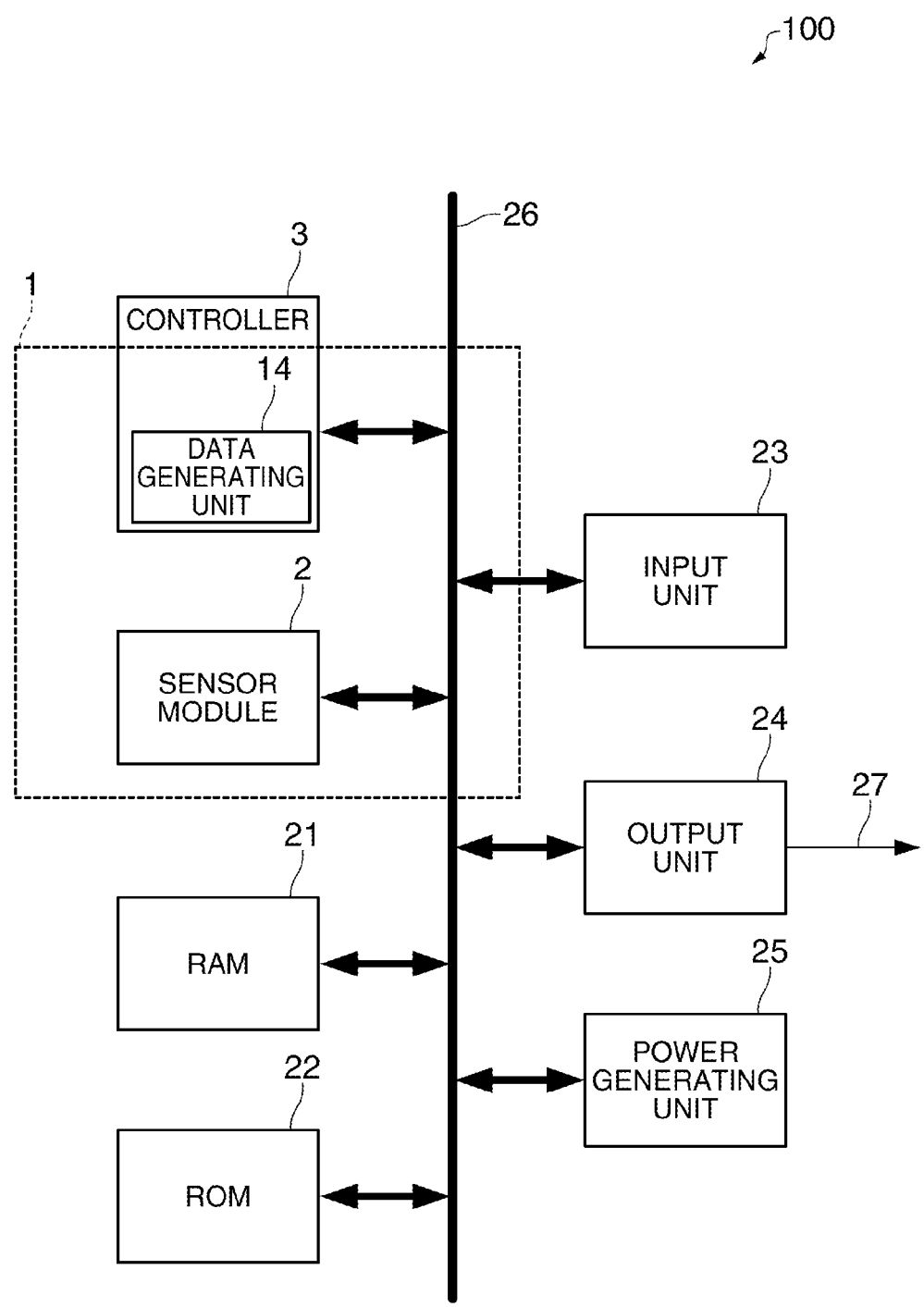
FIG. 3 is a diagram showing a sensing device in the first embodiment.

FIG. 3 is a diagram showing the sensing device 100 in the first embodiment. Components same as those shown in FIGS. 1 and 2 are denoted by the same reference numerals and signs and explanation of the components is omitted.

The sensing device 100 may include, besides a configuration 1 in FIG. 1 indicated by a dotted line, a random access memory (RAM) 21, a read only memory (ROM) 22, an input unit 23, an output unit 24, and a power generating unit 25. These components may be capable of inputting and outputting addresses, data, and the like to and from one another or in a determined direction through a bus 26. The bus 26 may be, for example, an I$^2$C bus or an SPI (Serial Peripheral Interface) bus.

The sensing device 100 may include a controller 3. A part of the controller 3 may realize the data generating unit 14. The controller 3 may be a microcomputer, a CPU, or the like.

The RAM 21 stores a computer program, various parameters, temporary data, and the like. For example, when the controller 3 is a CPU, the RAM 21 may store a computer program used by the CPU. The RAM 21 may store the arithmetic operation parameters 8 (see FIG. 2).

The ROM 22 is a nonvolatile memory and stores a computer program and various parameters necessary for the sensing device 100. Data and the like may be written in the RAM 21 when the sensing device 100 is started.

The input unit 23 receives an input from the outside of the sensing device 100, converts the input into predetermined data, and outputs the data. For example, when the register unit 12 (see FIG. 2) prepares a register for setting the thresholds and the like, a user may set values of the thresholds and the like through the input unit 23.

The output unit 24 outputs a signal to the outside of the sensing device 100. For example, the data generating unit 14 may output the output data 9 and the state output signal 19 (see FIG. 2) as an output signal 27.

The power generating unit 25 generates power used in the sensing device 100.

1.4. Explanation of a Waveform Chart

Figure 4:
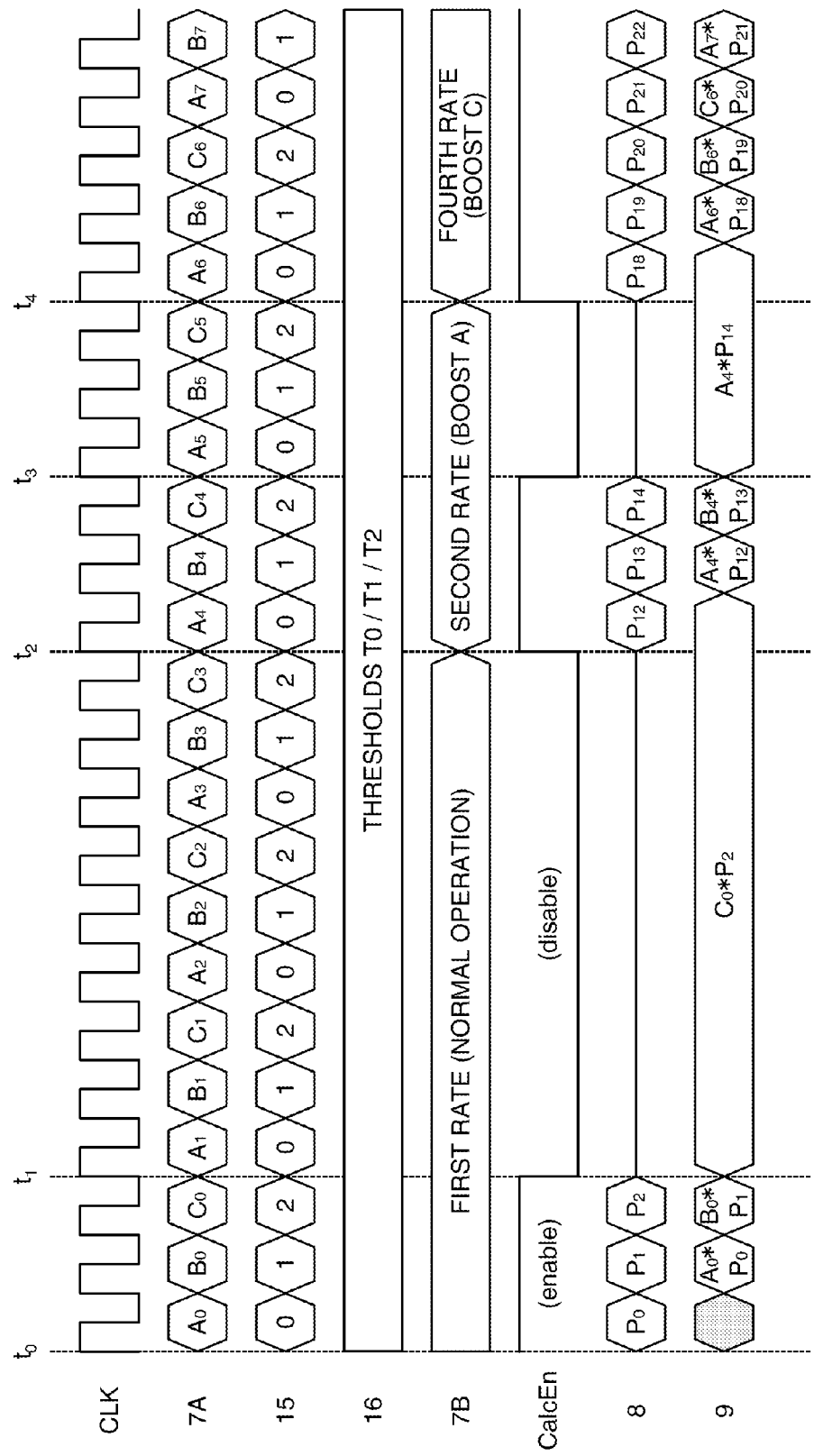
FIG. 4 is a waveform chart in the first embodiment.

FIG. 4 shows a waveform chart in the first embodiment. Reference numerals and signs in the waveform chart correspond to those in FIGS. 1 to 3. CLK represents a clock signal. In this example, assuming that the group of sensors include three sensors 4A, 4B, and 4C and the sensor 4C is a motion sensor, a change in the output data 9 is explained. CalcEn represents an enable signal for generating output data in the data arithmetic operation unit 34. The data arithmetic operation unit 34 generates an internal signal CalcEn according to the received rate designation signal 7B.

In the following explanation, a state of the sensing device that generates output data at a rate higher than usual is represented as a boost state. When rates at plural stages are present in a boost, boosts are distinguished with suffixes attached thereto in such a manner as boost A and boost B.

The comparing and determining unit 13 acquires thresholds T0, T1, and T2 from the register unit 12 as the threshold information 16. It is assumed that the thresholds are in a relation of T0<T1<T2. In this example, the sensing device is in a normal state and a state of boosts A, B, and C. The comparing and determining unit 13 selects data of the motion sensor 4C from the sensor module output signal 7A, compares the data with these thresholds, and generates the rate designation signal 7B. The data of the motion sensor 4C is C0, C1, C2, and the like. The comparing and determining unit 13 can select these data on the basis of the count value 15.

The comparing and determining unit 13 designates the first rate if the data of the motion sensor 4C is smaller than the threshold T0. The first rate is a rate for generation of the output data 9 in a normal operation. Since all the data C0 to C2 are smaller than the threshold T0, the rate designation signal 7B keeps the first rate (time t0 to t2).

The comparing and determining unit 13 designates the second rate if the data of the motion sensor 4C is equal to or larger than the threshold T0 and smaller than the threshold T1 and designates the fourth rate if the data of the motion sensor 4C is equal to or larger than the threshold T2. The second rate and the fourth rate respectively indicate the states of the boost A and the boost C. Data generation at a rate higher than usual is requested.

Since the data C3 is equal to or larger than the threshold T0 and smaller than the threshold T1, the rate designation signal 7B changes after the data C3 (time t2). The comparing and determining unit 13 designates the second rate (time t2 to time t4). The data C4 is also equal to or larger than the threshold T0 and smaller than the threshold T1.

Since the data C5 is equal to or larger than the threshold T2, the rate designation signal 7B changes after the data C5 (time t4). The comparing and determining unit 13 designates the fourth rate (after time t4).

The data arithmetic operation unit 34 generates the output data 9 at a rate corresponding to the rate designation signal 7B. In this example, the data arithmetic operation unit 34 controls generation of output data according to the internal signal CalcEn. The data arithmetic operation unit 34 reads the necessary arithmetic operation parameters 8.

In this example, it is assumed that the rate is ¼ during the normal operation and output rates are respectively ½, ⅔, and 1 in the case of the boosts A, B, and C. When the rate is 1, this means that the output data 9 is generated at every cycle. When the rate is ¼, this means that only one output data 9 is generated at four cycles.

At time t0 to time t2, the rate designation signal 7B designates the first rate. Since the rate for generating the output data 9 is ¼, the data arithmetic operation unit 34 enables CalcEn at time t0 to time t1 and disables CalcEn at time t1 to time t2. At this point, the output data 9 equivalent to three cycles are output at twelve cycles.

In the example shown in FIG. 4, a product of the signal 7A and the arithmetic operation parameters 8 is output as the output data 9 (e.g., A0*P0). However, various arithmetic operation results may be output. It is assumed that the output data 9 is a register output.

At time t2 to time t4, the rate designation signal 7B designates the second rate. Since the rate for generating the output data 9 is ½, the data arithmetic operation unit 34 enables CalcEn at time t2 to time t3 and disables CalcEn at time t3 to time t4. At this point, the output data 9 equivalent to three cycles are output at six cycles.

After time t4, the rate designation signal 7B designates the fourth rate. Since the rate for generating the output data 9 is 1, the data arithmetic operation unit 34 enables CalcEn after time t4. At this point, the output data 9 is always output.

In this way, the rate is changed according to an output from the motion sensor only when a boost operation is necessary. This makes it possible to suppress power consumption compared with power consumed when output data is always generated at a high rate.

1.5. Flowchart

Figure 5:
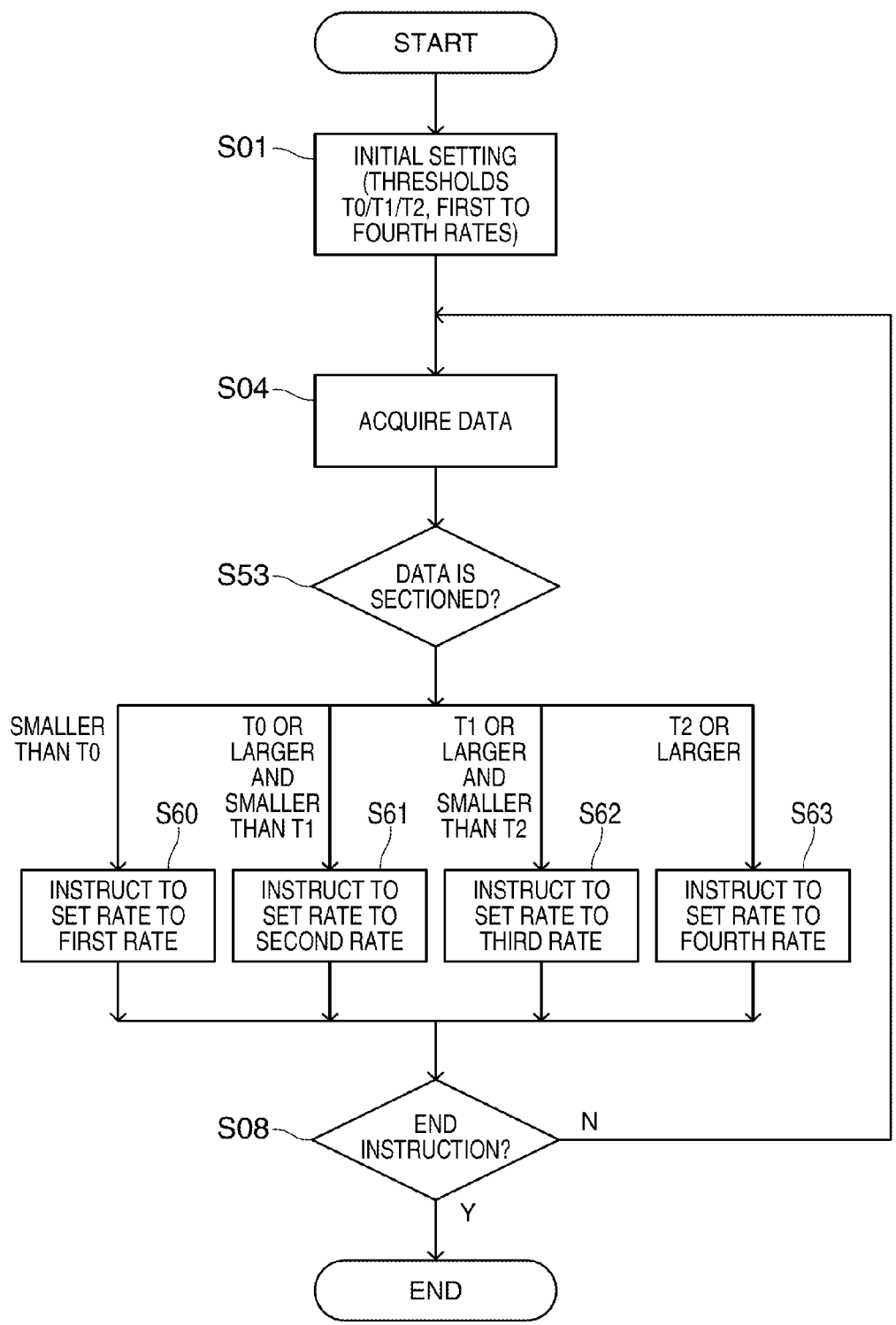
FIG. 5 is a flowchart in the first embodiment.

FIG. 5 shows a flowchart in the first embodiment. The comparing and determining unit 13 in the first embodiment instructs the data arithmetic operation unit 34 to switch the rate according to FIG. 5.

First, initial setting is performed (S01) and the three kinds of thresholds T0 to T2 and the first to fourth rates are set. It is assumed that the thresholds are in a relation of T0<T1<T2, the first rate is a normal rate, the second rate is higher than the first rate, the third rate is higher than the second rate, and the fourth rate is higher than the third rate.

The comparing and determining unit 13 acquires data of the motion sensor (S04). The comparing and determining unit 13 compares the acquired data with the thresholds T0 to T2 and determines to which section the data belongs (S53). Specifically, the comparing and determining unit 13 instructs the data arithmetic operation unit 34 to set the rate to the first rate if the data of the motion sensor is smaller than the threshold T0 (S60), set the rate to the second rate if the data is equal to or larger than the threshold T0 and smaller than the threshold T1 (S61), set the rate to the third rate if the data is equal to or larger than the threshold T1 and smaller than the threshold T2 (S63), and set the rate to the fourth rate if the data is equal to or larger than the threshold T2. Rather than directly comparing the data of the motion sensor, the comparing and determining unit 13 may acquire several data, compare, for example, a result of averaging, and set the rate.

The rate can be finely sectioned in this way. This makes it possible to more appropriately suppress power consumption, for example, when the motion of an apparatus mounted with the sensing device is switched at multiple stages. For example, when the sensing device 100 is mounted on a vehicle that usually moves at high speed, there could be a request for changing the rate in the case of complete stop (e.g., data of the motion sensor is smaller than the threshold T0) and in the case of low-speed movement (e.g., data of the motion sensor is equal to or larger than the threshold T0 and smaller than the threshold T1) and suppressing power consumption stepwise. Such control can be realized according to the flow of FIG. 5.

Thereafter, if no end instruction is received, the comparing and determining unit 13 returns to S04 and repeats the operation and the determination (N in S08). If an end instruction is received, the comparing and determining unit 13 ends the processing (Y in S08).

2. Second Embodiment

A second embodiment of the invention is explained with reference to FIGS. 6 to 8. In the second embodiment, output data is generated at a first rate or a second rate higher than the first rate on the basis of an output of a motion sensor. Since the rates are switched, it is possible to simplify switching control in a data generating unit by setting the rates at two stages while suppressing power consumption.

2.1. Configuration of a Sensing Device

The configuration of a sensing device in the second embodiment is the same as that in the first embodiment (FIGS. 1 to 3). Therefore, explanation concerning the configuration is omitted.

2.2. Explanation of a Waveform Chart

The output data 9 is explained with reference to FIG. 6. Since explanation of signals and the like is the same as that in the first embodiment, detailed explanation of the signals and the like is omitted.

In this example, a group of sensors include the three sensors 4A, 4B, and 4C. Assuming that all the sensors are motion sensors, a change in the output data 9 is explained.

The comparing and determining unit 13 acquires a first threshold and a second threshold from the register unit 12 as the threshold information 16. The first threshold and the second threshold may be the same value. However, it is assumed that the second threshold is smaller than the first threshold.

As the count value 15, in this example, values of 0 to 2 are repeated because three clocks are a determination time. It is possible to distinguish according to the count value 15 from which of the sensors the data of the sensor module output signal 7A is output.

During a normal operation, the comparing and determining unit 13 designates the second rate (boost) if data of the sensors 4A to 4C, which are the motion sensors, i.e., the sensor module output signal 7A is equal to or larger than the first threshold.

Figure 6:
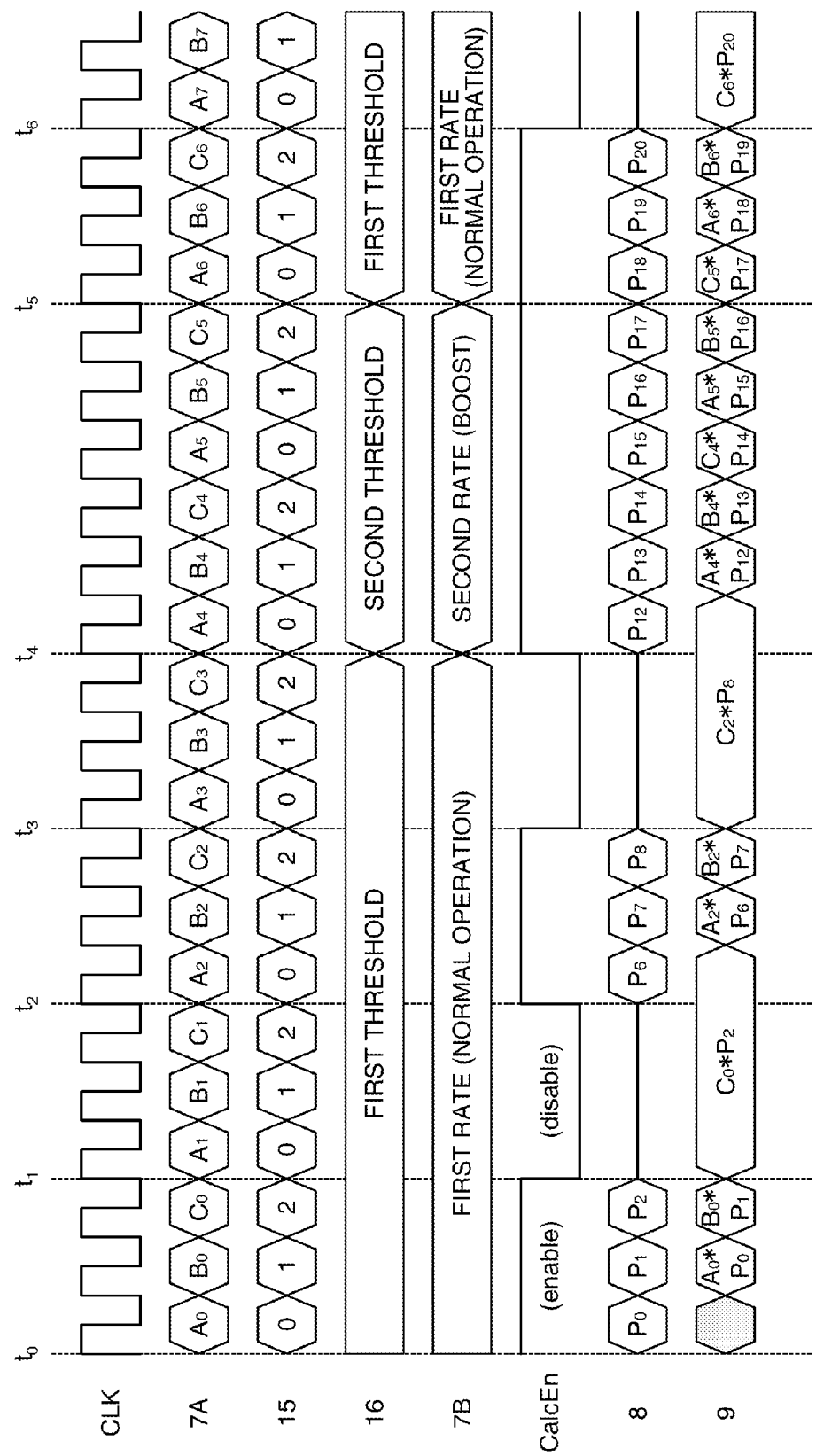
FIG. 6 is a waveform chart in a second embodiment.

In FIG. 6, since all data A0 to B3 are smaller than the first threshold, the rate designation signal 7B keeps the first rate (the normal operation) (time t0 to time t4). Thereafter, since data C3 of the sensor module output signal 7A is equal to or larger than the first threshold, the comparing and determining unit 13 designates the second rate according to the rate designation signal 7B (time t4).

During boost, the comparing and determining unit 13 designates the first rate if the sensor module output signal 7A is smaller than the second threshold.

Data itself of the sensor module output signal 7A may be compared with the second threshold. However, a value obtained by subjecting the data to arithmetic processing may be compared. In this example, it is assumed that an average of the sensor module output signal 7A in the determination time (time equivalent to three clocks indicated by the count value 15) is compared with the second threshold. At this point, it is possible to prevent a rate from changing by mistake because of the influence of noise or the like.

At time t4 to time t5, the comparing and determining unit 13 calculates averages (A4+B4+C4)/3 and (A5+B5+C5)/3 and compares the averages with the second threshold. In FIG. 6, assuming that (A5+B5+C5)/3 is smaller than the second threshold, the first rate is designated after the data C5 (time t5).

After time t5, processing by the comparing and determining unit 13 is the same as the processing at time t0 to time t4.

The data arithmetic operation unit 34 generates the output data 9 at a rate corresponding to the rate designation signal 7B. Specifically, the data arithmetic operation unit 34 controls the internal signal CalcEn, reads the arithmetic operation parameters 8 according to necessity, and generates the output data 9.

In this example, it is assumed that the rate is ½ during a normal rate and is 1 during the boost.

While the rate designation signal 7B designates the first rate (time t0 to time t4 and after time t5), CalcEn is reversed at every three cycles and output data is generated in only a half of a period (time t0 to time t1, time t2 to time t3, and time t5 to time t6). Therefore, the rate is ½.

On the other hand, output data is always generated during the boost. Therefore, while the rate designation signal 7B designates the second rate (time t4 to time t5), output data continues to be generated.

In this embodiment, since the rates are switched, switching control in the data generating unit is simplified by setting the rates at two stages while suppressing power consumption. This makes it possible to reduce a circuit size and prevent a control program from becoming complicated.

2.3. Explanation of a Waveform Chart of a Modification

In the example shown in FIG. 6, output data is generated concerning all of the group of sensors 4A to 4C during the boost (time t4 to time t5 in FIG. 6). However, in some case, different plural kinds of sensors are included in the group of sensors 4A to 4C. For example, it is also possible that only the sensor 4B, which is an acceleration sensor, is requested to perform data output at a high rate during the boost and the other sensors (4A and 4C) may perform data output in the same manner as at the normal time.

According to this modification, switching of the two rates (the first rate and the second rate) is applied to only a part of the group of sensors. Therefore, it is possible to suppress power consumption compared with power consumed when all the sensors operate according to the second rate higher than the first rate.

Figure 7:
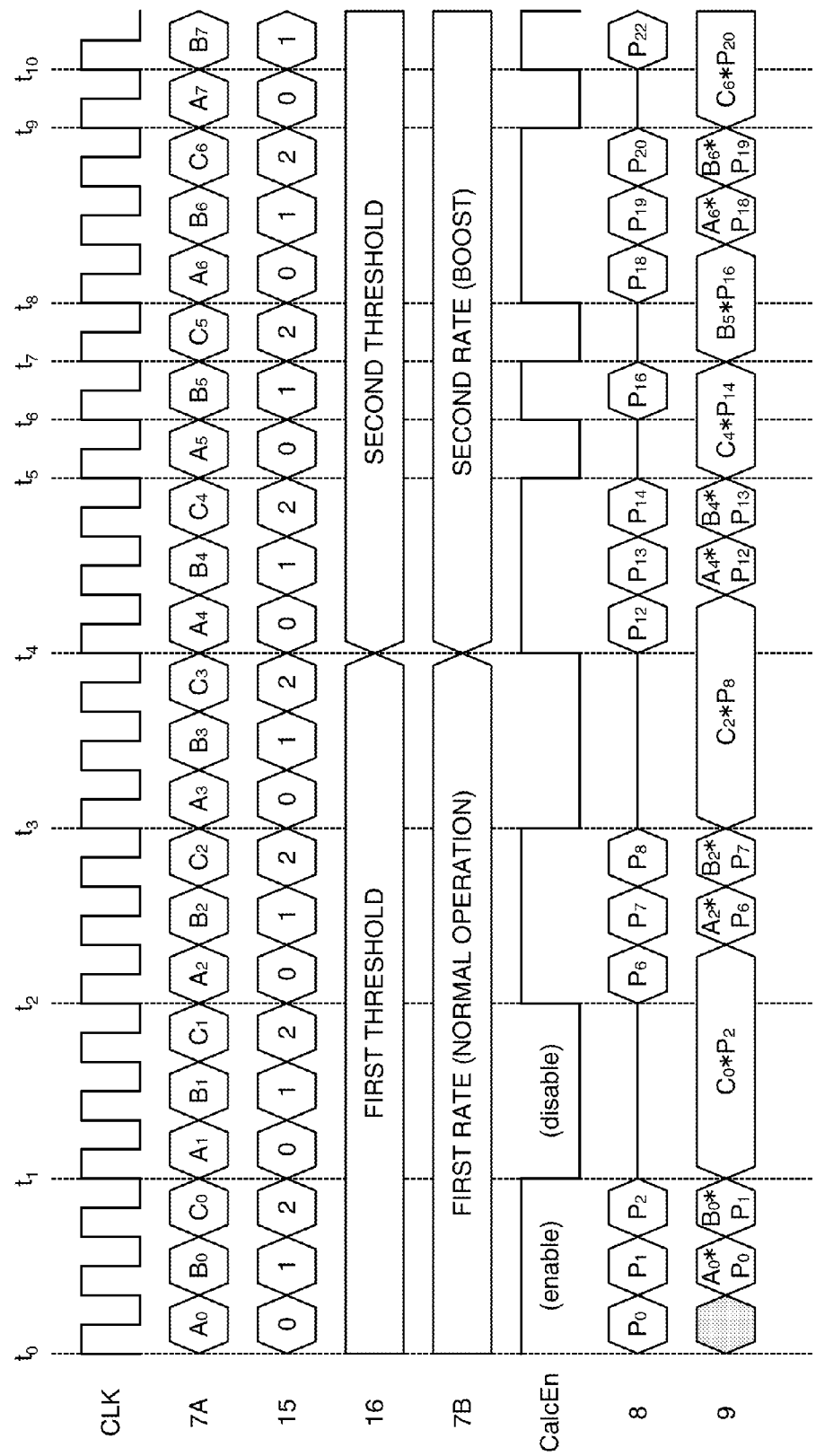
FIG. 7 is a waveform chart in a modification of the second embodiment.

FIG. 7 is a waveform chart in a modification of the second embodiment obtained when only the sensor 4B is requested to perform data output at a high rate during the boost. Since signals and the like are the same as those shown in FIG. 6, explanation of the signals and the like is omitted. Since the normal operation (time t0 to time t4) in which the first rate is designated is the same as that in the second embodiment, explanation of the normal operation is omitted.

During the boost, the data arithmetic operation unit 34 distinguishes, according to the count value 15 or the like, from which of the sensors the data of the sensor module output signal 7A is output. It is possible to apply the second rate to only a part of the sensors by controlling the CalcEn signal for each of the sensors.

Specifically, concerning the sensors A and C, the data arithmetic operation unit 34 disables CalcEn (time t5 to time t6, time t7 to time t8, and time t9 to time t10) during the boost (time t4 to time t10) in the same manner as during the normal operation. This makes it possible to create a state in which a boot mode is applied to only the sensor 4B.

The comparing and determining unit 13 performs processing same as that in the second embodiment without change.

2.4. Flowchart

Figure 8:
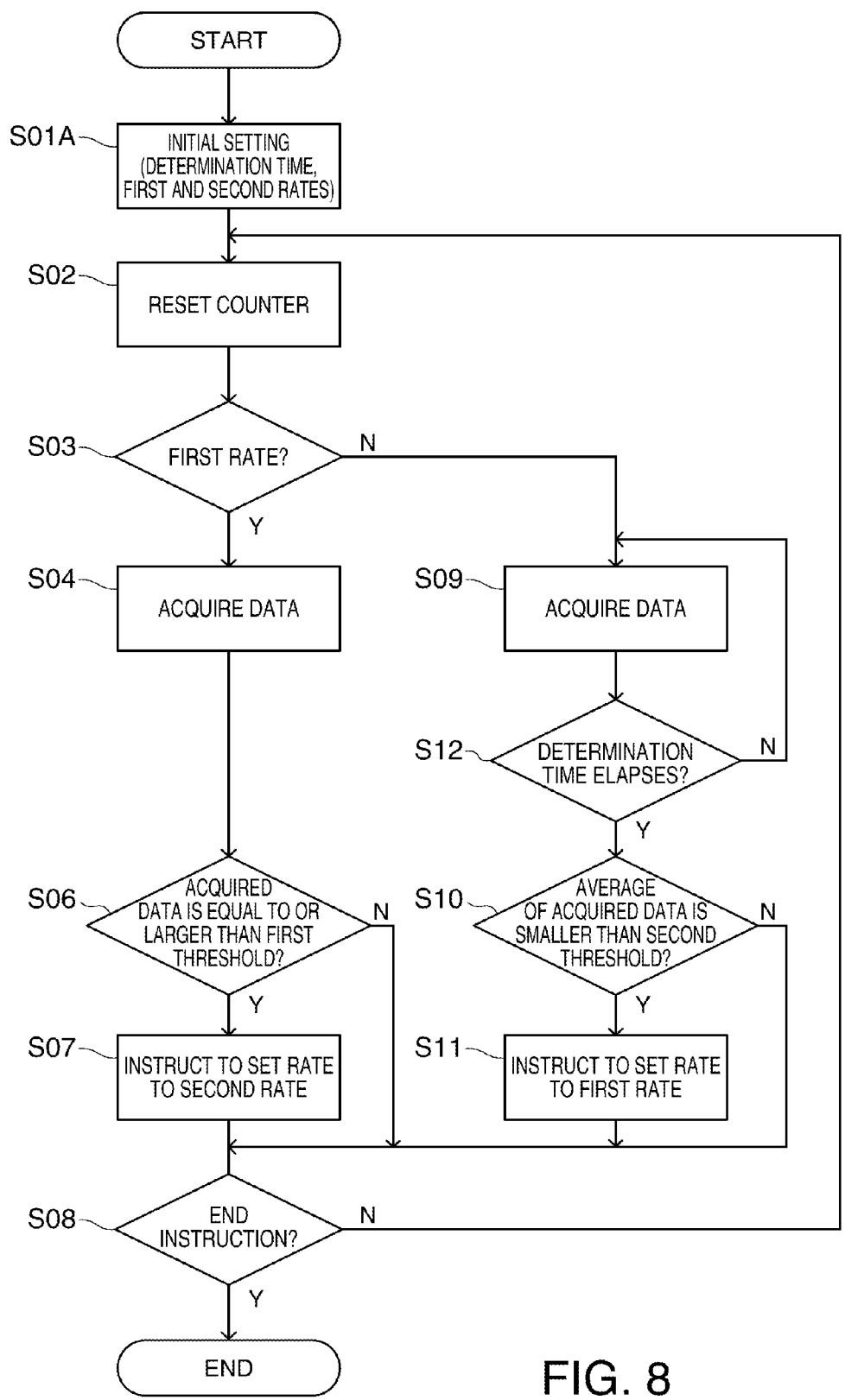
FIG. 8 is a flowchart in the second embodiment.

FIG. 8 shows a flowchart in the second embodiment. Steps same as those in FIG. 5 are denoted by the same reference signs and explanation of the steps is omitted.

The comparing and determining unit 13 in the second embodiment instructs the data arithmetic operation unit 34 to set a rate designated according to FIG. 8.

First, initial setting is performed concerning rates (S01A). In this example, the first rate, which is the normal rate, and the second rate, which is the rate higher than the first rate, are set as the rates. A determination time is also set.

Subsequently, the comparing and determining unit 13 resets a counter for measuring elapse of the determination time (S02). In this embodiment, the counter of the count unit 11 is reset.

The comparing and determining unit 13 checks a rate (S03) and performs different operation according to the rate. In this embodiment, it is assumed that the sensing device 100 performs the normal operation during the start and the first rate is designated (Y in S03).

The comparing and determining unit 13 acquires data of the motion sensor (S04). If the data is equal to or larger than the first threshold (Y in S06), the comparing and determining unit 13 designates the second rate, which is the high rate. If the data is smaller than the first threshold (N in S06), the comparing and determining unit 13 designates the first rate same as the present rate.

On the other hand, during the boost when the second rate is designated (N in S03), the comparing and determining unit 13 repeatedly acquires data (S09) until the determination time elapses (N in S12).

After the determination time elapses (Y in S12), the comparing and determining unit 13 calculates an average of the acquired data and compares the average with the second threshold (S10). If the average is smaller than the second threshold (Y in S10), the comparing and determining unit 13 designates the first rate (S11). If the average is equal to or larger than the second threshold (N in S10), the comparing and determining unit 13 designates the second rate same as the present rate.

Thereafter, if no end instruction is received, the comparing and determining unit 13 returns to S02 and repeats the operation and the determination (N in S08). If an end instruction is received, the comparing and determining unit 13 ends the processing (Y in S08).

3. Notification of an Internal State of the Sensing Device

Means and a method for notifying a state of a rate in the first and second embodiments to the outside of the sensing device are explained with reference to FIG. 9. Since information concerning an output rate is determined by the sensor module and the data generating unit, the information is closed on the inside of the sensing device 100. However, it is desirable in terms of system management and appropriate data access to include means for making it possible to recognize the state of the rate in the first and second embodiments from the outside of the sensing device 100. Therefore, means explained below makes it possible to refer to the state of the rate from the outside of the sensing device.

3.1. Status Register

Figure 9:
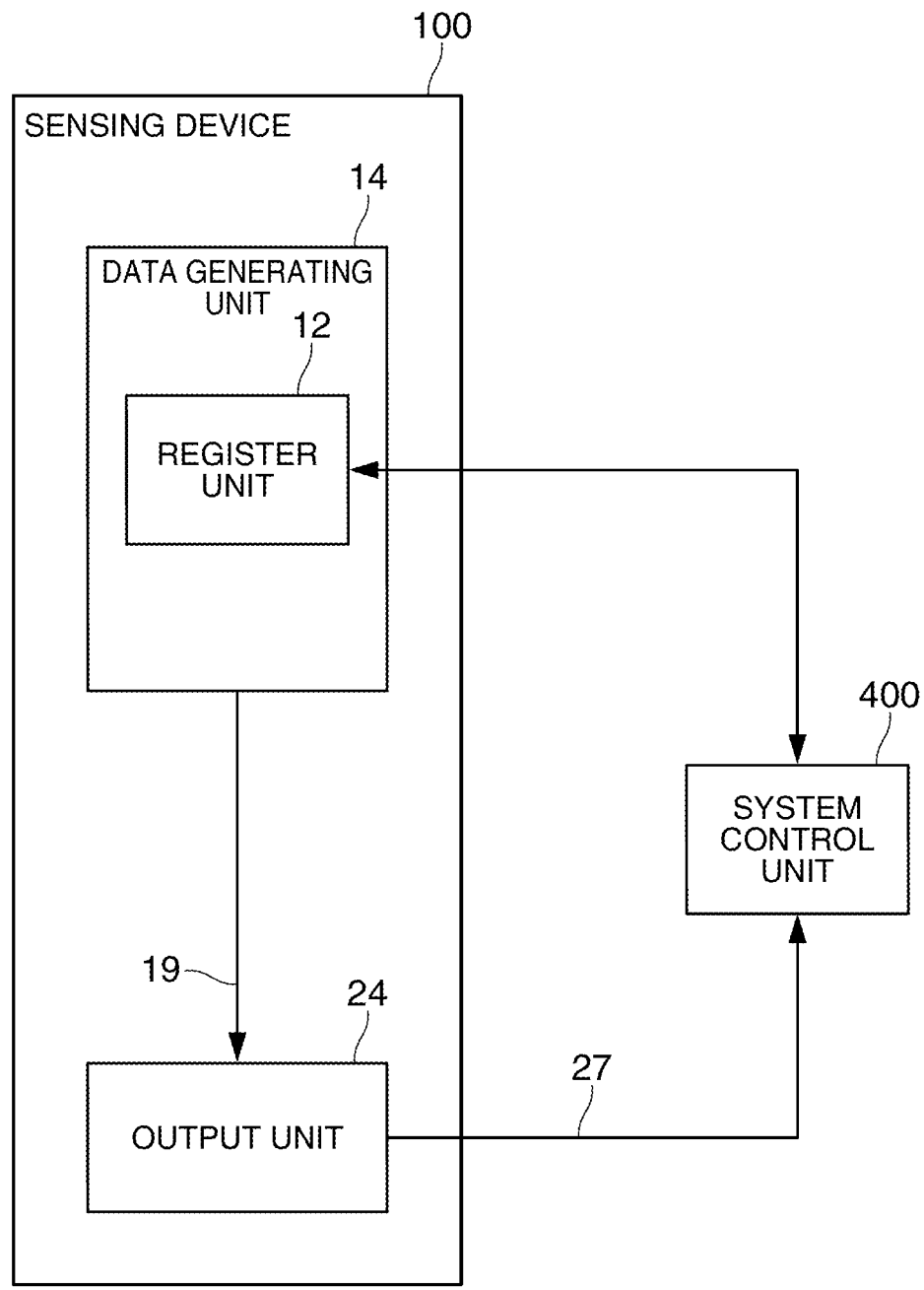
FIG. 9 is a diagram showing a connection example of a sensing device and a system control unit.

FIG. 9 shows connection of the sensing device 100 and a system control unit 400 in the first and second embodiments. The system control unit 400 is a control unit that manages the entire system including the sensing device 100.

The data generating unit 14 of the sensing device 100 may include the register unit 12. The register unit 12 has information concerning a rate as a status register. The status register is accessible from the system control unit 400 via, for example, the bus 26 (see FIG. 3). For example, the system control unit 400 can grasp a state of the rate by periodically accessing this register.

In changing the rate, the comparing and determining unit 13 simultaneously updates the status register using the rate designation signal 7B (see FIG. 2). Consequently, the latest state of the rate is reflected on the status register.

3.2. Exclusive Output Signal

The data arithmetic operation unit 34 may output a signal representing the state of the rate (a state output signal 19) from the output unit 24 as the output signal 27. In this case, the system control unit 400 can always grasp the operation mode and the state of the rate without accessing the status register.

3.3. Interrupt Signal

However, for example, when the number of wires from the output unit 24 to the system control unit 400 is limited, the data arithmetic operation unit 34 may generate an interrupt signal when an instruction for changing the rate is received. The interrupt signal may be output as the output signal 27 through the output unit 24. The interrupt signal can be realized by one signal line. The system control unit 400 that receives an interrupt request can grasp the state of the rate after change by accessing the status register. Since the interrupt occurs simultaneously with the update of the status register, the system control unit 400 can efficiently grasp the state of the rate.

The output signal 27 may include not only a signal concerning the rate but also other status signals and the like.

4. Application Examples

Application examples of the invention are explained with reference to FIGS. 10A to 10C. The sensing device 100 explained above can be applied to various electronic apparatuses.

Figure 10A:
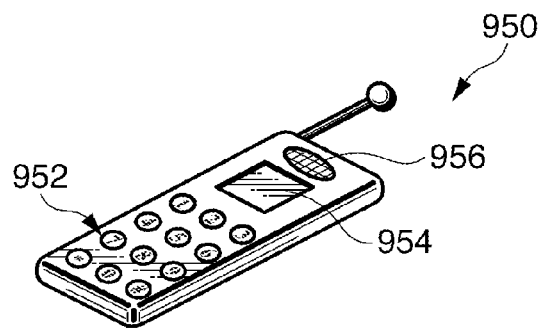
FIG. 10A is a diagram of a cellular phone, which is an example of an electronic apparatus.

An example of an external view of a cellular phone 950, which is one of the electronic apparatuses, is shown in FIG. 10A. The cellular phone 950 includes a dial button 952 that functions as an input unit, an LCD 954 that displays a telephone number, a name, an icon, and the like, and a speaker 956 that functions as a sound output unit and outputs sound.

Figure 10B:
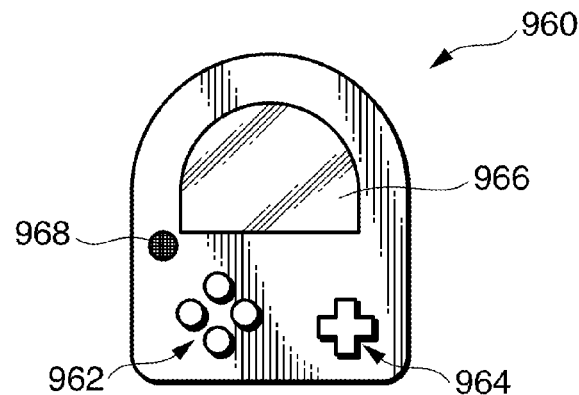
FIG. 10B is a diagram of a portable game apparatus, which is an example of the electronic apparatus.

An example of an external view of a portable game apparatus 960, which is one of the electronic apparatuses, is shown in FIG. 10B. The portable game apparatus 960 includes an operation button 962 and a cross key 964 that function as input units, an LCD 966 that displays a game image, and a speaker 968 that functions as a sound output unit and outputs game sound.

Figure 10C:
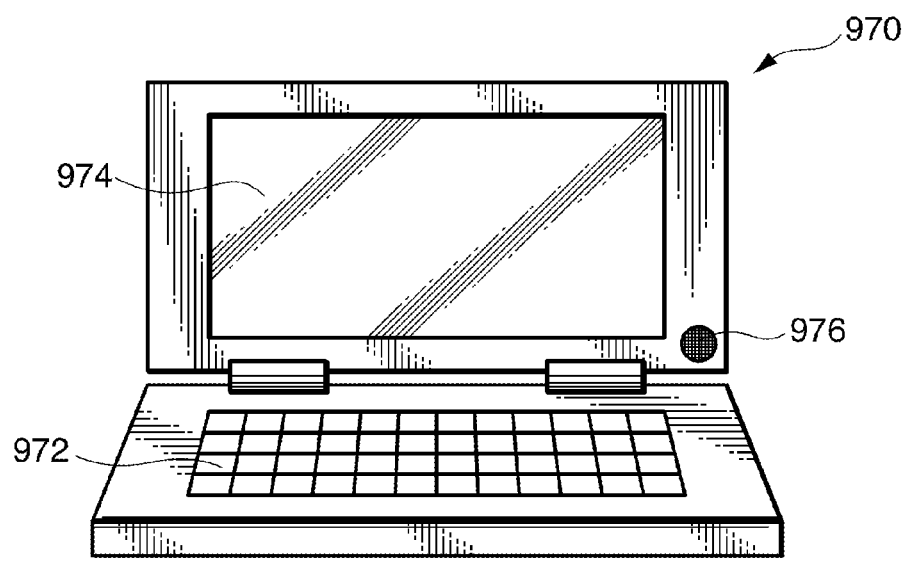
FIG. 10C is a diagram of a personal computer, which is an example of the electronic apparatus.

An example of an external view of a personal computer 970, which is one of the electronic apparatuses, is shown in FIG. 10C. The personal computer 970 includes a keyboard 972 that functions as an input unit, an LCD 974 that displays characters, numbers, graphics, and the like, and a sound output unit 976.

By incorporating the sensing device according to the embodiments in the electronic apparatuses shown in FIGS. 10A to 10C, for example, it is possible to suppress power consumption when there is no motion in the electronic apparatuses. Therefore, it is possible to provide suitable electronic apparatuses having a long battery driving time.

5. Others

In the embodiments, the state in which the rate for generating output data is the high rate is the boost state of the sensing device and the state in which the rate for generating output data is the low state is the normal state. However, the same control and method can be used when the state in which the rate for generating output data is the high rate is the normal state of the sensing device and the state in which the rate for generating output data is the low state is a low power consumption state. In other words, in the embodiments, the state of the sensing device may change between the normal state and the low power consumption state.

In the embodiments, the sensing devices may have a configuration in which the blocks (the sensor module 2, the data generating unit 14, etc.) are individually connected not through the bus 26 shown in FIG. 3. The motion sensor may be either a one-dimensional motion sensor or a multi-dimensional motion sensor.

The invention is not limited to the examples explained above and includes configurations substantially the same as the configurations explained in the embodiments (e.g., configurations having the same functions, methods, and results or configurations having the same purposes and effects). The invention includes configurations obtained by replacing non-essential sections of the configurations explained in the embodiments. The invention includes configurations that can realize working effects same as those of the configurations explained in the embodiment and realize purposes same as those of the configurations. The invention includes configurations obtained by adding publicly-known techniques to the configurations explained in the embodiments.

The entire disclosure of Japanese Patent Application No. 2010-164597, filed Jul. 22, 2010 is expressly incorporated by reference herein.

What is claimed is:

1. A sensing device comprising:
   a sensor module including a group of sensors, at least one of which is set as a motion sensor; and
   a data generating unit that generates output data on the basis of outputs from the group of sensors, wherein
   the data generating unit switches a rate for generating the output data based on an output from the motion sensor relative to a threshold T1 and a threshold T0 which is less than T1, wherein the data generating unit sets the rate to a first rate when the output from the motion sensor is less than T0, the data generating unit sets the rate to a second rate when the output from the motion sensor is greater than or equal to T0 and less than T1, and the data generating unit sets the rate to a third rate when the output from the motion sensor is greater than or equal to T1.

2. The sensing device according to claim 1, wherein the data generating unit can switch the first rate and the second rate higher than the first rate, performs switching from the first rate to the second rate on the basis of a comparison result of a signal based on the output from the motion sensor and the threshold T1, and performs switching from the second rate to the first rate on the basis of a comparison result of the signal based on the output from the motion sensor and the threshold T0.

3. The sensing device according to claim 2, wherein the data generating unit performs the switching from the second rate to the first rate on the basis of a comparison result of the signal based on the output from the motion sensor and the threshold T1 in a given time.

4. The sensing device according to claim 3, wherein the data generating unit performs the switching from the second rate to the first rate on the basis of a comparison result of an average of signals based on outputs from the motion sensor in a given period and the threshold T1.

5. The sensing device according to claim 1, wherein the group of sensors includes two or more motion sensors, and the data generating unit switches the rate for generating the output data based on the output of at least one of the motion sensors relative to the threshold T1 and the threshold T0.

6. The sensing device according to claim 1, further comprising a register unit including a status register that represents the rate, wherein the data generating unit updates the status register when the rate changes.

7. The sensing device according to claim 6, wherein the data generating unit outputs an interrupt signal when the status register is updated.

8. The sensing device according to claim 1, wherein the data generating unit outputs a signal representing the rate for generating the output data.

9. An electronic apparatus comprising the sensing device according to claim 1.

* * * * *